(12) United States Patent
Badrak

(10) Patent No.: US 6,935,429 B2
(45) Date of Patent: *Aug. 30, 2005

(54) FLASH WELDING PROCESS FOR FIELD JOINING OF TUBULARS FOR EXPANDABLE APPLICATIONS

(75) Inventor: Robert P. Badrak, Sugar Land, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 191 days.

This patent is subject to a terminal disclaimer.

(21) Appl. No.: 10/356,360

(22) Filed: Jan. 31, 2003

(65) Prior Publication Data

US 2004/0149439 A1 Aug. 5, 2004

(51) Int. Cl.[7] ............................ E21B 43/10; E21B 19/00
(52) U.S. Cl. ........................ 166/380; 166/384; 166/207
(58) Field of Search ................................ 166/380, 384, 166/207; 228/112.1, 155

(56) References Cited

U.S. PATENT DOCUMENTS

| | | | |
|---|---|---|---|
| 1,981,525 A | 11/1934 | Price | 166/4 |
| 2,627,891 A | 2/1953 | Clark | 153/82 |
| 3,191,677 A | 6/1965 | Kinley | 166/14 |
| 3,195,646 A | 7/1965 | Brown | 166/208 |
| 3,565,192 A * | 2/1971 | McLarty | 175/246 |
| 3,712,376 A | 1/1973 | Owen et al. | 166/277 |
| 3,818,734 A | 6/1974 | Bateman | 72/75 |
| 3,844,007 A * | 10/1974 | Kojima | 29/33 A |
| 3,911,707 A | 10/1975 | Minakov et al. | 72/76 |
| 4,069,573 A | 1/1978 | Rogers, Jr. et al. | 29/421 |
| 4,127,168 A | 11/1978 | Hanson et al. | 166/123 |
| 4,159,564 A | 7/1979 | Cooper, Jr. | 29/727 |
| 4,288,082 A | 9/1981 | Setterberg, Jr. | 277/125 |
| 4,319,393 A | 3/1982 | Pogonowski | 29/434 |
| 4,483,399 A | 11/1984 | Colgate | 166/308 |
| 4,509,777 A | 4/1985 | Walker | 285/286 |
| 4,538,442 A | 9/1985 | Reed | 72/367 |
| 4,723,905 A | 2/1988 | Vassallo et al. | 425/392 |
| 5,052,483 A | 10/1991 | Hudson | 166/55 |
| 5,348,095 A | 9/1994 | Worrall et al. | 166/380 |
| 5,685,369 A | 11/1997 | Ellis et al. | 166/195 |
| 5,992,329 A * | 11/1999 | Scheuchzer et al. | 104/15 |
| 6,000,482 A | 12/1999 | Michalski | 175/57 |
| 6,012,523 A | 1/2000 | Campbell et al. | 166/277 |
| 6,018,859 A * | 2/2000 | Borzym et al. | 29/458 |
| 6,021,850 A | 2/2000 | Wood et al. | 166/380 |
| 6,029,748 A | 2/2000 | Forsyth et al. | 166/380 |
| 6,053,247 A | 4/2000 | Wesson et al. | 166/297 |
| 6,098,717 A | 8/2000 | Bailey et al. | 166/382 |
| 6,325,148 B1 | 12/2001 | Trahan et al. | 166/297 |
| 6,425,444 B1 | 7/2002 | Metcalfe et al. | 166/387 |
| 6,446,323 B1 | 9/2002 | Metcalfe et al. | 20/523 |
| 6,446,724 B2 | 9/2002 | Baugh et al. | 166/285 |
| 6,457,532 B1 | 10/2002 | Simpson | 166/380 |
| 6,527,049 B2 | 3/2003 | Metcalfe et al. | 166/277 |
| 6,543,552 B1 | 4/2003 | Metcalfe et al. | 175/57 |
| 6,578,630 B2 | 6/2003 | Simpson et al. | 166/55.8 |
| 6,585,053 B2 | 7/2003 | Coon | 166/387 |
| 2001/0040054 A1 | 11/2001 | Haugen et al. | |
| 2001/0045284 A1 | 11/2001 | Simpson et al. | |
| 2002/0145281 A1 | 10/2002 | Metcalfe et al. | |
| 2002/0166668 A1 | 11/2002 | Metcalfe et al. | |
| 2003/0037931 A1 | 2/2003 | Coon | |
| 2003/0042022 A1 | 3/2003 | Lauritzen et al. | |
| 2003/0047322 A1 | 3/2003 | Maguire et al. | |
| 2004/0155091 A1 * | 8/2004 | Badrak | 228/112.1 |

FOREIGN PATENT DOCUMENTS

| | | | | |
|---|---|---|---|---|
| EP | 0 961 007 | | 12/1999 | E21B/33/10 |
| FR | 1 448 304 | | 9/1976 | E21B/33/13 |
| GB | 2 345 308 | | 7/2000 | E21B/43/10 |
| WO | WO 00/37772 | | 6/2000 | E21B/43/10 |

* cited by examiner

*Primary Examiner*—William Neuder
(74) *Attorney, Agent, or Firm*—Moser, Patterson & Sheridan

(57) ABSTRACT

The present invention generally relates to methods of connecting two expandable tubulars. In one aspect, the method includes flash welding the ends of the expandable tubulars together. Thereafter, the connected tubulars are lowered into the wellbore for expansion. The flash welding process provides a highly reliable joint for expansion.

23 Claims, 2 Drawing Sheets

FLASH WELDING PROCESS FOR FIELD JOINING OF TUBULARS FOR EXPANDABLE APPLICATIONS

BACKGROUND OF THE INVENTION

1. Field of the Invention

The present invention relates to wellbore completion. More particularly, the invention relates to apparatus and methods of connecting two tubulars. More particularly still, the invention relates to apparatus and methods of connecting two expandable tubulars at the well site.

2. Description of the Related Art

In the drilling of oil and gas wells, a wellbore is formed using a drill bit that moves downwardly at a lower end of a drill string. After drilling a predetermined depth, the drill string and bit are removed, and the wellbore is typically lined with a string of steel pipe called casing. The casing provides support to the wellbore and facilitates the isolation of certain areas of the wellbore adjacent hydrocarbon bearing formations. The casing typically extends down the wellbore from the surface of the well to a designated depth. An annular area is thus defined between the outside of the casing and the earth formation. This annular area is filled with cement to permanently set the casing in the wellbore and to facilitate the isolation of production zones and fluids at different depths within the wellbore.

It is common to employ more than one string of casing in a wellbore. In this respect, a first string of casing is set in the wellbore when the well is drilled to a first designated depth. The well is then drilled to a second designated depth, and a second string of casing, or liner, is run into the well to a depth whereby the upper portion of the second liner overlaps the lower portion of the first string of casing. The second liner string is then fixed or hung in the wellbore, usually by some mechanical slip mechanism well-known in the art, and cemented. This process is typically repeated with additional casing strings until the well has been drilled to total depth.

However, one drawback of this process is that as the wellbore is extended, the inner diameter of the well progressively decreases. This is because subsequent liners must have an outer diameter that is smaller than an inner diameter of earlier casings in order to pass through the earlier casings. As a result, top-hole sizes must be sufficiently large so that the final casing has the desired inner diameter size.

Recently, expandable tubular technology has been developed to overcome this problem. Generally, expandable technology enables a smaller diameter tubular to pass through a larger diameter tubular, and thereafter expanded to a larger diameter. In this respect, expandable technology permits the formation of a tubular string having a substantially constant inner diameter, otherwise known as a monobore. Accordingly, monobore wells have a substantially uniform through-bore from the surface casing to the production zones.

A monobore well features each progressive borehole section being cased without a reduction of casing size. The monobore well offers the advantage of being able to start with a much smaller surface casing but still end up with a desired size of production casing. Further, the monobore well provides a more economical and efficient way of completing a well. Because top-hole sizes are reduced, less drilling fluid is required and fewer cuttings are created for cleanup and disposal. Also, a smaller surface casing size simplifies the wellhead design as well as the blow out protectors and risers. Additionally, running expandable liners instead of long casing strings will result in valuable time savings.

Typically, expandable liners are constructed of multiple tubulars connected end to end. The tubulars are generally connected using a threaded connection. As the threads are made up, a metal-to-metal seal is created between the two tubulars. Thereafter, the entire length of the expandable liner is deployed into the wellbore. The expandable liners are typically expanded by the use of a cone-shaped mandrel or by an expander tool, such as a rotary expander tool having one or more rollers.

A problem arises when the threaded connection is expanded. Generally, the male and female threads of a threaded connection are specifically designed to mate with each other to form a fluid tight seal. However, the specifications of the threads do not take into account the expansion of the threaded connection. By plastically deforming or expanding the threaded connection, the requirements of the threads to form a fluid tight seal are necessarily altered. For example, the tight metal-to-metal seal created between the female thread and the male thread becomes slack, thereby jeopardizing the seal at the threaded connection.

A need, therefore, exists for an expandable tubular connection. There is a further need for a method of forming a tubular connection that maintains a fluid tight seal upon expansion of the tubular connection.

SUMMARY OF THE INVENTION

The present invention generally relates to methods of connecting two expandable tubulars. In one aspect, the method includes flash welding the ends of the tubulars together. The flash welding process provides a highly reliable joint for expansion.

In another aspect, the present invention provides an apparatus for connecting a first tubular to a second tubular. The apparatus includes a housing disposed around an end of the first tubular and the second tubular. The apparatus may also include one or more sealing elements disposed within each of the tubulars. A conductive member may be connected to each end of the tubulars to conduct a current. The apparatus may also include a translational member for moving the first tubular toward the second tubular to join the heated tubular ends.

In another aspect, the present invention generally relates to methods of completing a well. In one embodiment, the method includes flash welding the ends of two expandable tubulars together. Thereafter, the connected tubulars are lowered into the wellbore to a predetermined location. Then, the connected tubulars are expanded in the wellbore.

In another aspect, the present invention provides a method of completing a well. The method involves flash welding a first tubular to a second tubular. The method includes disposing a housing around an end of the first tubular and an end of the second tubular. Thereafter, a non-flammable gas may be provided within the housing to facilitate the welding process and/or prevent ingress of flammable mixtures of hydrocarbons. After the tubulars have been joined, the tubulars may be expanded downhole.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
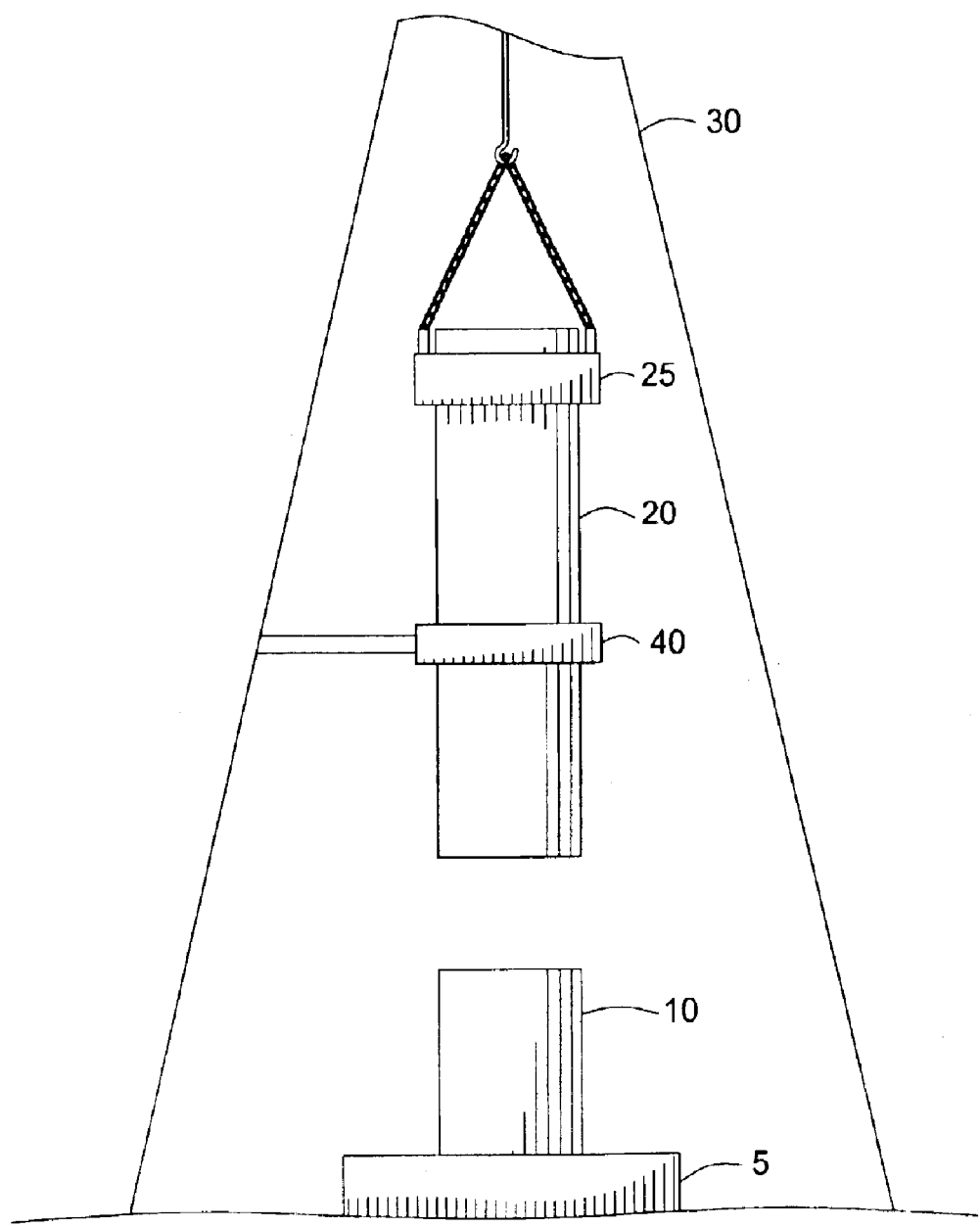
FIG. 1 is a cross-sectional view of a tubular positioned above another tubular held in a wellhead.

Aspects of the present invention provide apparatus and methods of connecting expandable tubulars using flash welding. FIG. 1 is a schematic view of a first tubular 10 ready to be joined with a second tubular 20. As shown, the first tubular 10 at least partially extends above the wellhead 5 and is held in place by a spider (not shown). The second tubular 20 is suspended above the first tubular 10 by an elevator 25 operatively connected to the rig 30. A tubular handling device 40 attached to the rig 30 may be used to help position the second tubular 20.

In one embodiment, the first and second tubulars 10, 20 are expandable tubulars to be joined and expanded downhole. Examples of expandable tubulars include expandable solid tubulars, expandable slotted tubulars, expandable screens, and combinations thereof. Further, the first and second tubulars 10, 20, as used herein, may include a single tubular or a tubular string formed by more than one tubular.

Figure 2:
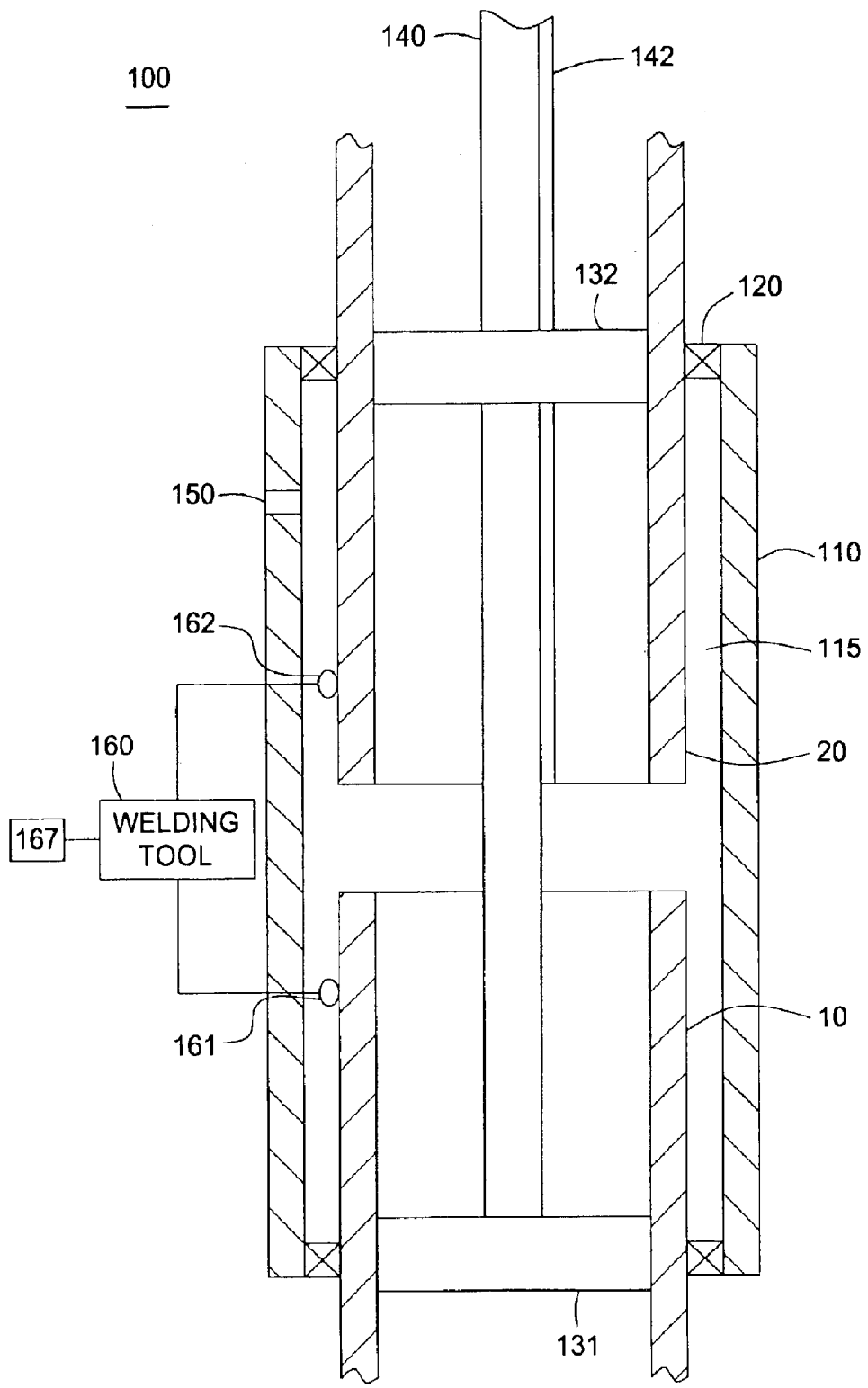
FIG. 2 is schematic view of an apparatus for flash welding two tubulars.

FIG. 2 shows an apparatus 100 for flash welding the second tubular 20 to the first tubular 10 according to aspects of the present invention. The apparatus 100 includes a tubular housing 110 at least partially disposed around the first and second tubulars 10, 20. One end of the housing 110 overlaps the first tubular 10 while the other end of the housing 110 overlaps the second tubular 20. Preferably, an inner diameter of the housing 110 is larger than an outer diameter of the tubulars 10, 20 such that an annular space 115 is formed therebetween. The housing 110 should be made from a material capable of tolerating high temperatures, such as metal. In one embodiment, the housing 110 defines a single sleeve tubular. In another embodiment, the housing 110 defines two arcuate portions hinged together. Spacers 120 may be placed at each end of the housing 110 to seal off the annular space 115. The spacers 120 may be made from an elastomeric material, metal, or combinations thereof.

One or more sealing elements 131, 132 may be placed within the first and second tubulars 10, 20 to seal off the bores of the tubulars 10, 20. In one embodiment, inflatable packers 131, 132 are used to seal off the tubulars 10, 20. The inflatable packers 131, 132 may be connected to a tubular conveying member 140 for positioning the inflatable packers 131, 132. The conveying member 140 may be in fluid communication with the packers 131, 132 so that it may provide pressure to actuate the packers 131, 132. In another embodiment, the sealing elements 131, 132 may be formed of a water soluble material. The water soluble sealing elements 131, 132 may be caused to dissolve immediately after flash welding the tubulars together. Alternatively, the water soluble sealing elements 131, 132 may remain in the tubulars 10, 20 after the connection is made and dissolved at a later time.

In another aspect, the conveying member 140 may optionally include a second conveying member 142 for providing gas into the area enclosed by the packers 131, 132 and the housing 110. Preferably, the supplied gas is an inert gas, a non-flammable gas, or combinations thereof. The inert gas may supplant or dilute the air in the enclosed area, thereby decreasing the possibility of oxide forming on the heated tubulars 10, 20. Impurities such as oxide formed during the welding process are undesirable because they weaken the bond between the joined tubulars 10, 20. In another embodiment, the inert gas may be delivered through one or more ports 150 formed in the housing 110. As shown in FIG. 1, the ports 150 are formed on a wall of the housing 110. However, the ports 150 may also be formed in the spacers 120 or other suitable surface of the housing 110 as is known to a person of ordinary skill in the art. It must be noted that the ports 150 may be used in combination with the second conveying member 142 to inject inert gas into the enclosed area.

The apparatus 110 may also include a welding tool 160, which is schematically shown in FIG. 1. The welding tool 160 may be used to supply the current necessary to perform the flash welding process. The welding tool 160 may be selected from any suitable flash welding machine as is known to a person of ordinary skill in the art. An exemplary flash welding tool may comprise a bank of 12 volt lead-acid batteries or a direct current generator with appropriate tubular gripping members to handle the relative positioning of the tubular members throughout the joining process. As schematically shown in FIG. 2, the welding tool 160 has at least one conductive member 161, 162 for contacting each tubular 10, 20. In one embodiment, clamps 161, 162 are used to contact the tubulars 10, 20 to provide current to the tubulars 10, 20 for the flash welding process. The welding tool 160 may further include a translational member 167 for moving the tubulars 10, 20 toward each other. In one embodiment, the translational member 167 may comprise a piston and cylinder assembly to bring the clamps 161, 162 closer to each other. Upon actuation, the piston and cylinder assembly 167 may cause the first tubular 20 to move closer to the second tubular 20.

In operation and as one example of the process, the second tubular 20 is positioned above the first tubular 10 in the wellbore as shown in FIG. 1. Once in position, a clamp 161, 162 is attached to each tubular 10, 20 proximate the ends of the tubular 10, 20 to be joined. Thereafter, the housing 110 is disposed around the tubulars 10, 20. An inflatable packer 131, 132 is then placed in the bore of each tubular 10, 20. Fluid is supplied to the inflatable packers 131, 132 to actuate the packers 131, 132, thereby sealing off the bores of the tubulars 10, 20. After the packers 131, 132 are actuated, inert gas is injected into the enclosed area to displace most of the air. Preferably, the inert gas is injected through the ports 150 of the housing 110.

The welding process begins by bringing the tubulars 10, 20 into contact with each other. During the flash welding process, current is applied to each tubular 10, 20 through the clamps 161, 162. The current applied initially results in heating of each tubular 10, 20 due to the electrical circuit formed by contacting the tubular ends. The resistance that naturally occurs at the interface between the tubulars 10, 20 causes the "flashing" for which the joining process is known. The flashing action continues until the ends of the tubulars 10, 20 reach a plastic state and a predetermined temperature. The plastic portion and the adjacent heated portion of the tubulars 10, 20 are commonly referred to as the heat-affected zone, or HAZ.

The flash welding process concludes with the upset or forging action. When the tubulars 10, 20 have reached the plastic state and the proper temperature, the ends of the tubulars 10, 20 are brought together with enough force to cause the tubular ends to upset. Particularly, the piston and cylinder assembly 167 of the welding tool 160 is actuated to cause the contacting end of the second tubular 20 to move into the contacting end of the first tubular 10. The speed of the movement between tubulars 10, 20 for the upset action may be controlled by adjusting the piston size or rate of pressure increase. The upset action forces the plastic portions and most of the impurities out of the formed joint.

EXAMPLE

In one example, two expandable tubulars having about 2" outer diameters and about 0.156" wall thickness are joined in accordance with the aspects of the present invention. The initial spacing gap between the tubulars was 0.25". The starting flash was set when the relative position between the two clamps was about 3.5". The upset was initiated at a relative clamp position of about 2" with an upset pressure of 600 psi. During the welding process, the voltage was set at about 12 VAC and the total cycle time including positioning was about 30 seconds. The final relative clamp position was between about 0.8" to about 1.2".

The flash welding process may optionally include an additional preheating action. In one embodiment, the ends of the tubulars 10, 20 may be caused to oscillate against each other. Initially, the ends are brought together to allow heat to be generated from the resistance of the tubulars 10, 20.

When the ends begin to cool and solidify, the preheating action is repeated and continued in a rapid motion until heat is generated at both ends of the tubulars 10, 20. The preheat stage is performed until the proper HAZ is obtained. Thereafter, the flash weld stage is performed and the two tubular ends are forged together.

Advantages of the preheating the tubulars include the ability to weld a large cross-sectional area with lower current demand. Additionally, the temperature gradient may remain more uniform during the process. Finally, heat may be generated in high strength alloys without a large loss of material by the flashing action.

After the proper length of tubular has been formed, the tubular may be lowered into the wellbore along with an expander tool. When the tubular reaches the proper depth in the wellbore, the expander tool is actuated to expand the tubular. Examples of the expander tool include rotary expander tools and coneshaped mandrels. In this respect, the flash welded joint is plastically deformed, but retains its fluid tight seal. In this manner, expandable tubulars may be joined and expanded downhole.

While the foregoing is directed to embodiments of the present invention, other and further embodiments of the invention may be devised without departing from the basic scope thereof, and the scope thereof is determined by the claims that follow.

I claim:

1. A method of well completion, comprising:
    connecting an end of a first expandable tubular to an end of a second expandable tubular using a flash welding process;
    lowering the connected tubulars into a wellbore; and
    expanding at least a portion of the tubulars.

2. The method of claim 1, wherein the flash welding process includes:
    causing the ends of the tubulars to become plastic; and
    connecting the two ends of the tubulars together.

3. The method of claim 2, wherein the flash welding process further includes:
    preheating the ends of the tubulars.

4. The method of claim 1, wherein the flash welding process is at least partially performed in a housing.

5. The method of claim 4, wherein an annular space is formed between the housing and the first tubular.

6. The method of claim 5, further comprising sealing off the annular space using one or more spacers.

7. The method of claim 1, further comprising disposing one or more sealing elements in a bore of each tubular.

8. The method of claim 7, further comprising actuating the one or more sealing elements to seal off the bore of each tubular.

9. The method of claim 1, wherein the tubulars are expanded with an expander tool.

10. The method of claim 9, wherein the expander tool is selected from the group consisting of a rotary expander tool and a cone-shaped mandrel.

11. The method of claim 1, wherein the first tubular is at least partially held in a wellbore.

12. A method of completing a well, comprising:
    disposing a housing around an end of a first tubular to be joined with an end of a second tubular;
    providing the housing with a non-flammable gas;
    connecting the first expandable tubular to the second expandable tubular using a flash welding process; and
    expanding at least a portion of the tubulars.

13. The method of claim 12, further comprising disposing one or more sealing elements in each of the tubulars.

14. The method of claim 13, wherein the one or more sealing elements is selected from the group consisting of an inflatable packer and a water soluble sealing element.

15. The method of claim 12, wherein the tubulars are connected at a well site.

16. An apparatus for connecting a first expandable tubular to a second expandable tubular, comprising:
    a housing disposable around an end of the first and second tubulars;
    one or more sealing elements disposable within each of the tubulars;
    a conductive member connected to each end of the tubulars; and
    a translational member for moving the first tubular toward the second tubular.

17. The apparatus of claim 16, wherein the housing and the one or more sealing elements cooperate to isolate the ends of the tubulars to be joined.

18. The apparatus of claim 16, wherein the one or more sealing elements are selected from the group consisting of inflatable packers and water soluble sealing elements.

19. The apparatus of claim 16, further comprising a gas delivery member.

20. The apparatus of claim 19, wherein the gas delivery member comprises one or more ports formed on the housing.

21. The apparatus of claim 19, wherein the gas delivery member comprises a tube.

22. The apparatus of claim 16, wherein the apparatus may be applied at a well site to connect the tubulars.

23. The apparatus of claim 16, wherein the conductive member applies a current to the tubulars.

* * * * *